(12) United States Patent
Catalano (10) Patent No.: US 7,318,661 B2
(45) Date of Patent: Jan. 15, 2008

(54) UNIVERSAL LIGHT EMITTING ILLUMINATION DEVICE AND METHOD

(76) Inventor: Anthony Catalano, 1448 Carriage Hills Dr., Boulder, CO (US) 80302

( * ) Notice: Subject to any disclaimer, the term of this patent is extended or adjusted under 35 U.S.C. 154(b) by 140 days.

(21) Appl. No.: 10/820,930

(22) Filed: Apr. 8, 2004

(65) Prior Publication Data

US 2005/0057187 A1 Mar. 17, 2005

Related U.S. Application Data

(60) Provisional application No. 60/502,495, filed on Sep. 12, 2003.

(51) Int. Cl.
*F21V 7/00* (2006.01)
(52) U.S. Cl. ............... 362/297; 362/296; 362/310; 362/362; 362/646
(58) Field of Classification Search ............ 315/56–58, 315/185 S, 200 A, 312, 324; 362/646, 654, 362/296, 297, 310, 362, 800, 806, 810, 812
See application file for complete search history.

(56) References Cited

U.S. PATENT DOCUMENTS

| | | | |
|---|---|---|---|
| 3,795,830 A | 3/1974 | Richardson | |
| 4,211,955 A | 7/1980 | Ray | |
| 4,727,289 A | 2/1988 | Uchida | |
| 5,097,180 A * | 3/1992 | Ignon et al. ............ | 315/200 A |
| 5,222,800 A | 6/1993 | Chan et al. | |
| 5,463,280 A | 10/1995 | Johnson | |
| 5,465,197 A * | 11/1995 | Chien ..................... | 362/202 |
| 5,561,346 A | 10/1996 | Byrne | |
| 5,575,459 A | 11/1996 | Anderson | |
| 5,632,551 A | 5/1997 | Roney et al. | |
| 5,655,830 A | 8/1997 | Ruskouski | |
| 5,663,719 A | 9/1997 | Deese et al. | |
| 5,850,126 A | 12/1998 | Kanbar | |
| 5,936,599 A | 8/1999 | Reymond | |
| 5,994,845 A | 11/1999 | Gibboney, Jr. | |
| 6,091,614 A | 7/2000 | Malenfant | |
| 6,140,776 A | 10/2000 | Rachwal | |
| 6,150,771 A | 11/2000 | Perry | |
| 6,218,785 B1 * | 4/2001 | Incerti ..................... | 315/185 S |
| 6,232,784 B1 | 5/2001 | Dulasky | |
| 6,234,648 B1 | 5/2001 | Borner et al. | |
| 6,310,445 B1 | 10/2001 | Kashaninejad | |
| 6,371,636 B1 * | 4/2002 | Wesson .................... | 362/545 |
| 6,380,865 B1 | 4/2002 | Pederson | |
| 6,485,160 B1 * | 11/2002 | Sommers et al. ......... | 362/184 |
| 6,528,954 B1 | 3/2003 | Lys et al. | |
| 6,570,505 B1 | 5/2003 | Malenfant | |
| 6,644,841 B2 * | 11/2003 | Martineau ................ | 362/545 |
| 6,727,652 B2 * | 4/2004 | Sivacumarran ........... | 315/58 |
| 6,791,283 B2 | 9/2004 | Bowman et al. | |
| 6,819,056 B2 * | 11/2004 | Lin ......................... | 315/185 S |

(Continued)

*Primary Examiner*—Tuyet Vo
(74) *Attorney, Agent, or Firm*—Pritzkau Patent Group LLC (57) ABSTRACT

Disclosed is a method and apparatus for providing a light emitting diode and driving circuitry integrated into a component module that will retrofit common incandescent lightbulb applications. The disclosed embodiments will perform with high efficiency at a wide operating voltage range with a very small size allowing for the incorporation within the envelope and form of existing lightbulb bases. Therefore, a single universal LED light bulb module can be used to replace the dozens of conventional LED and incandescent lights currently being used. The electronic circuitries used to drive the LEDs are extremely compact and consequently can be incorporated in nearly any standard bulb base.

2 Claims, 9 Drawing Sheets

U.S. PATENT DOCUMENTS

| | | |
|---|---|---|
| 6,893,140 B2 | 5/2005 | Storey et al. |
| 6,924,605 B2* | 8/2005 | Chun ..................... 315/241 P |
| 6,981,784 B2* | 1/2006 | Dubuc ....................... 362/331 |
| 7,008,084 B2 | 3/2006 | Galli |
| 2002/0141196 A1* | 10/2002 | Camarota et al. ........... 362/372 |
| 2003/0067787 A1* | 4/2003 | Serizawa .................... 362/545 |
| 2003/0112627 A1* | 6/2003 | Deese ........................ 362/249 |
| 2003/0210552 A1* | 11/2003 | Barlian et al. .............. 362/376 |
| 2004/0070990 A1* | 4/2004 | Szypszak .................... 362/555 |
| 2004/0189262 A1 | 9/2004 | McGrath |
| 2005/0052865 A1* | 3/2005 | Siktberg et al. ............ 362/249 |

* cited by examiner

UNIVERSAL LIGHT EMITTING ILLUMINATION DEVICE AND METHOD

CROSS-REFERENCE TO RELATED APPLICATION

This non-provisional patent application claims benefit to provisional application 60/502,495 filed Sep. 12, 2003.

FIELD OF THE INVENTION

The present invention relates to a light emitting diode illumination device and method and more specifically to a light emitting diode and driving circuitry integrated into a component module that will retrofit common incandescent lightbulb applications.

BACKGROUND OF THE INVENTION

Currently, lightbulbs for low power lighting applications such as flashlights are dominated by incandescent lights that use hot filaments to provide radiant energy. The radiation that is emitted by hot filaments is spread over a wide spectral range and much of the energy is wasted owing to emission outside the visible range. Moreover, such filaments must be designed for the specific voltage of operation, e.g., a bulb designed for 2.7 volt (V) operation cannot be used for operation at a higher, 3.6 V level without causing immediate premature failure. Similarly, operating at a lower voltage, such as 2.2 V lowers the light output to unacceptable levels. In addition, wide varieties of low power lightbulb bases have been established over the last hundred years. Even without considering additional application factors, the combination of these two factors alone means that hundreds of distinct lightbulbs must be manufactured in order to meet specific application demands.

Light emitting diodes (LEDs) have operating advantages with respect to incandescent lights. LEDs can emit light in a narrow range of wavelengths so that a high proportion of the input energy is converted into light emitted within a specific wavelength envelope, resulting in application specificity and high efficiency. Such lights have very long life compared to incandescent lights (50,000 hours vs. 3-30 hrs for incandescent flashlight bulbs). Like incandescent bulbs, LEDs require a specific, narrow operating voltage range, ordinarily from 3.2 V to 4 V. Higher voltage results in premature failure and lower voltage results in little or no light output. Conventional LED illumination devices share high application specificity, resulting in a similarly large number of distinct products as with ordinary incandescent bulbs. This discourages conventional LED use, as retailers must now carry twice the already excessive inventory of the same product. In addition, LED lightbulbs for various voltages are commonly fabricated by incorporating a ballast resistor serving as a current limiter. This technique wastes energy and does not markedly increase the voltage operating range. LED circuits with current and voltage regulation have been utilized in applications such as traffic lights where large numbers of LEDs are packaged together to provide a bright, long lasting and highly efficient lighting. However, in a traffic light application, space is not a limitation, and so fairly complex and bulky electronic circuits have been used to meet these specialized needs.

SUMMARY OF THE INVENTION

The present invention overcomes the disadvantages and limitations of the prior art by providing a light emitting diode and driving circuitry integrated into a component module that will retrofit common incandescent lightbulb applications. The disclosed embodiments will perform with high efficiency at a wide operating voltage range with a very small size allowing for the incorporation within the envelope and form of existing lightbulb bases. Therefore, a single universal LED light bulb module can be used to replace the dozens of conventional LED and incandescent lights currently being used. The electronic circuitries used to drive the LEDs are extremely compact and consequently can be incorporated in nearly any standard bulb base. Because the operating voltage of these circuits is so wide, they are able to effectively draw out the last bit of energy present in a battery pack, providing excellent efficiency and capacity. For example, a 6 V battery pack will still operate the LED at full brightness when it only delivers slightly in excess of 1.5 V; in other words, the batteries are effectively "dead" with respect to conventional light bulbs, but this embodiment still operate as though the batteries were fully charged. In fact, there is little or no change in the light output from 6 V down to approximately 1.5 V, allowing for the use of nearly all the energy available from the battery. In addition, a 3 V battery pack and a 6 V battery pack for example, would use the exact same light bulb as described in this invention, being completely interchangeable.

The universal LED light bulb module can be driven by a circuit that is either a constant voltage output or a constant current output. The constant current design is preferred since light output is directly proportional to current, and slight differences in the LED manufacture require different operating voltages for a given light output. This constant current circuit is a high frequency, low power dc/dc converter. The high frequency of operation allows components of small size to be used. The essential feature of this circuit is a voltage comparator that regulates the voltage to a specified value to achieve the desired output. An inductor is charged to achieve the desired voltage output in the circuit. In the constant current implementation, a current sensing resistor is used to provide the voltage feedback. Although often designed for DC-to-DC operation in the range discussed, the disclosed constant current circuit can be easily modified to work at higher voltages by using for instance, a zener diode resistor combination, or to operate as an AC/DC converter by adding a rectifier circuit. Other features such as light sensors, pulse circuits etc., can be added to provide additional features such as flashing operation or dimming. Various logic signals can be easily adapted to introduce added functionality to the embodiments. For example, a single activation of a power switch could provide a low output light, a second activation producing a medium output light, a third activation producing a high output light, and a fourth activation shutting off the light. Multiple colored LEDs can also be used to vary the desired colored output.

An embodiment of the present invention may therefore comprise a universal LED lamp that is capable of replacing incandescent bulbs and that operates at various voltages comprising: a standard bulb base that is adapted to fit into standard bulb sockets; a printed circuit board that is electrically connected to a voltage input contact of the standard bulb base that is capable of fitting in the envelope of the standard bulb base; a driving circuit mounted on the printed circuit board that includes a solid state voltage comparator that regulates the input voltage to maintain an output voltage at a predetermined constant value within a predetermined range of input voltages that are both above and below the predetermined output voltage; an LED that is electrically connected to the output of the driving circuit and physically connected to the printed circuit board.

An additional embodiment of the present invention may also comprise a method of producing a universal LED lamp that is capable of replacing incandescent bulbs that operate at various voltages comprising: providing a standard bulb base that is adapted to fit into standard bulb sockets; electrically connecting a printed circuit board to a voltage input contact of the standard bulb base; mounting a driving circuit on the printed circuit board that includes a solid state voltage comparator; regulating the input voltage with the driving circuit to maintain an output voltage at a predetermined constant value within a predetermined range of input voltages that are both above and below the predetermined output voltage; fitting the printed circuit board within the standard bulb base; electrically connecting an LED to the output of the driving circuit; and, physically connecting the LED to the printed circuit board.

The disclosed embodiments offer the advantage of providing a universal LED light bulb module with long life and high efficiency at a wide operating voltage range with a very small size allowing for the incorporation within the envelope and form of existing lightbulb bases. The LED illumination module has the further advantage over conventional incandescent type bulbs by providing a precise wavelength output envelope, resulting in high efficiency and application specificity. Additionally, the high frequency of operation in the drive circuitry allows components of small size to be used and allows the device to effectively draw out the last bit of energy present in a battery pack. Additional ancillary features that are not currently available in incandescent bulbs such as light sensors, pulse circuits etc., can be added to the drive circuitry to provide additional features to conventional products.

DETAILED DESCRIPTION OF THE INVENTION

While this invention is susceptible to embodiment in many different forms, there are shown in the drawings and will be described herein in detail specific embodiments thereof with the understanding that the present disclosure is to be considered as an example of the principles of the invention and is not to be limited to the specific embodiments described.

Figure 1:
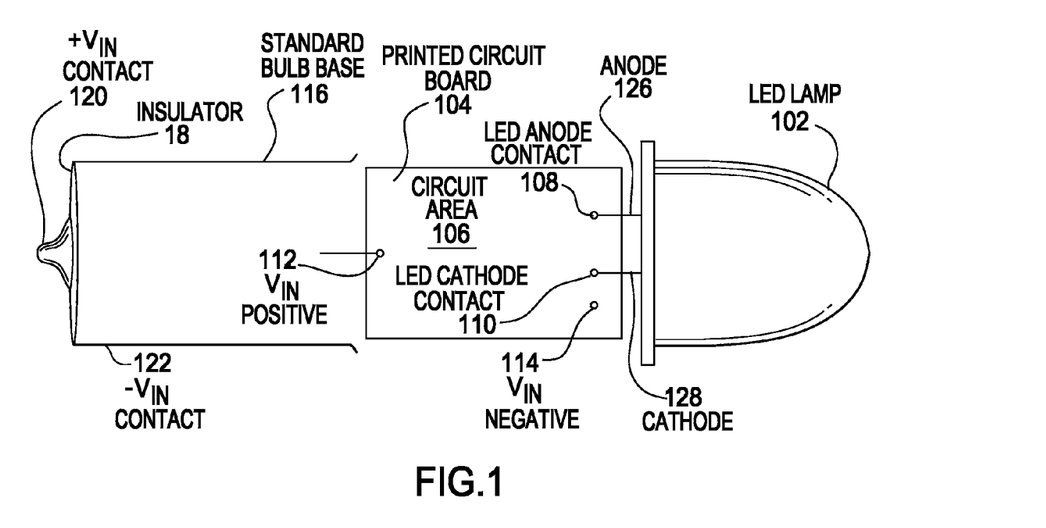
FIG. 1 is a drawing showing a typical embodiment of a universal LED illumination device to retrofit an incandescent lightbulb application.

FIG. 1 is a drawing showing a typical embodiment of a universal LED illumination device to retrofit an incandescent lightbulb application. As illustrated in FIG. 1, an LED illumination device 100 may be made up of an LED lamp 102 that is connected to a printed circuit board 104 by an anode 126 wire at an LED anode connect 108 and a cathode 128 wire and an LED cathode connect 110 located on the printed circuit board 104. This printed circuit board 104 contains electronic circuitry placed in circuit area 106 and is of small size enabling the printed circuit board 104 to fit within the envelope of a standard bulb base 116. Electrical connections from the circuit board 104 to the bulb base 116 are made via a $V_{in}$ positive 112 connector in connection with $+V_{in}$ contact 120 on the external distal apex of the bulb base and a Vin negative 114 connector in connection with $-V_{in}$ contact 122 on the side edge of the bulb base 116. The $+V_{in}$ contact 120 and the $-V_{in}$ contact 122 are isolated from one another by an insulator 118. The aforementioned configuration allows the LED illumination device 100 to conform to a standard bulb envelope thereby allowing the embodiment to be utilized as a replacement for conventional incandescent bulbs in a variety of applications. This replacement of incandescent lights with LED illumination affords numerous operating advantages. The disclosed LED embodiments are able to emit light in a narrow wavelength range resulting in the bulk of the energy consumed by the device to be emitted as visible light, thereby delivering much higher electrical to optical conversion efficiency than incandescent technology. Although red, green, and blue LEDs can be combined to produce white light, UV emitting LEDs can be used with fluorescing materials to produce white light for general illuminating applications. Such LEDs have very long life compared to incandescent lights (50,000 hours vs. 3-30 hrs for incandescent flashlight bulbs) in addition to the high efficiency of LEDs.

Figure 2:
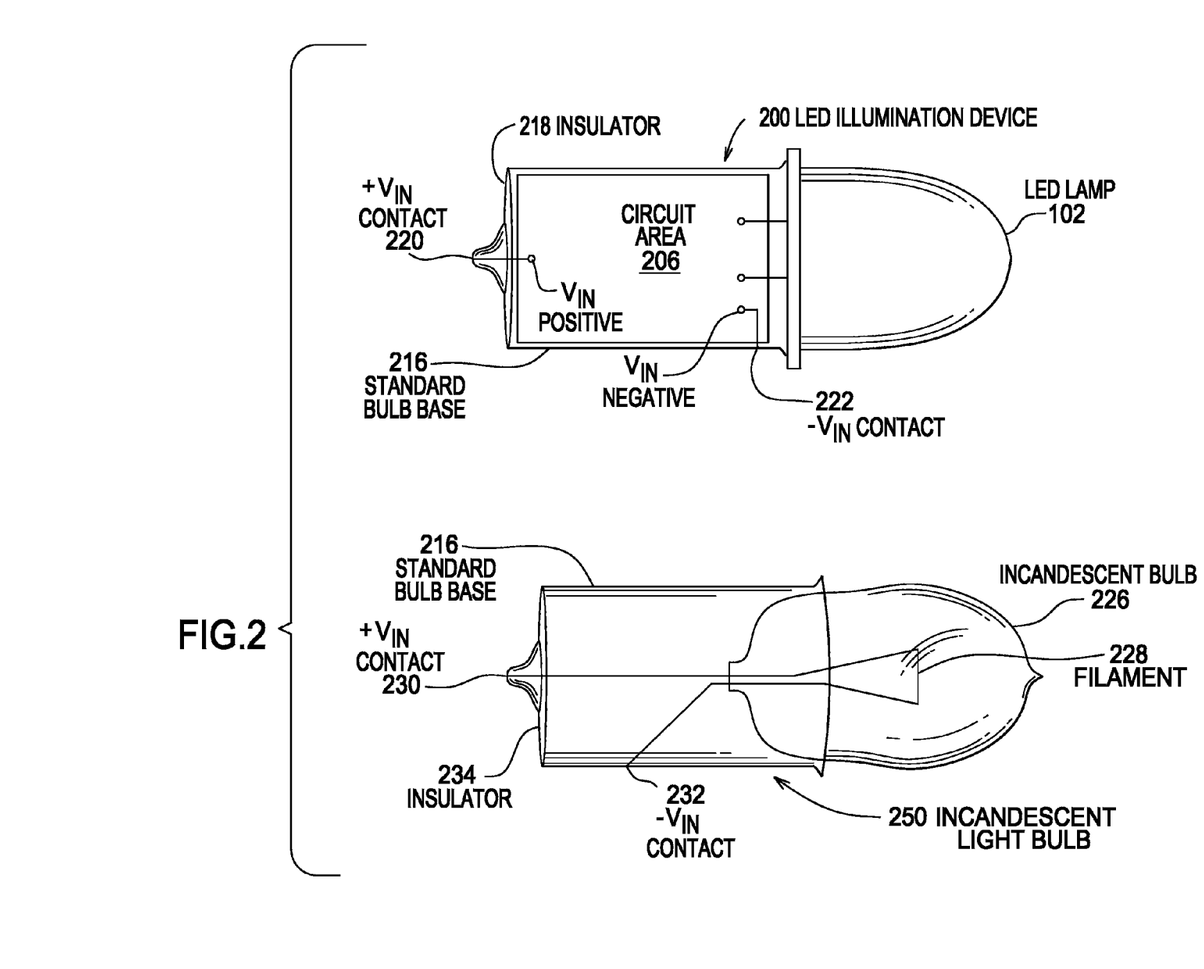
FIG. 2 is a drawing showing a typical embodiment of a universal LED illumination device in relation to an incandescent lightbulb.

FIG. 2 is a drawing showing a typical embodiment of a universal LED illumination device in relation to an incandescent lightbulb. As illustrated in FIG. 2, an LED illumination device 200 is contrasted with an incandescent lightbulb 250. A comparable size and functional relation is demonstrated in the disclosed embodiment of an LED lamp 202 driven by a logic circuit 206 in connection with a standard bulb base 216, mimicking the envelope of an incandescent bulb 226 with a resistive lighting filament 228 in a standard bulb base 216. Both designs include a base 216 with $+V_{in}$ contact, 220 and 230, and $-V_{in}$ contacts 222 and 232 isolated from one another by insulators 218 and 234. FIG. 2 further demonstrates the ability of an LED illumination device 200 to retrofit conventional incandescent bulbs in a variety of applications.

Figure 3:
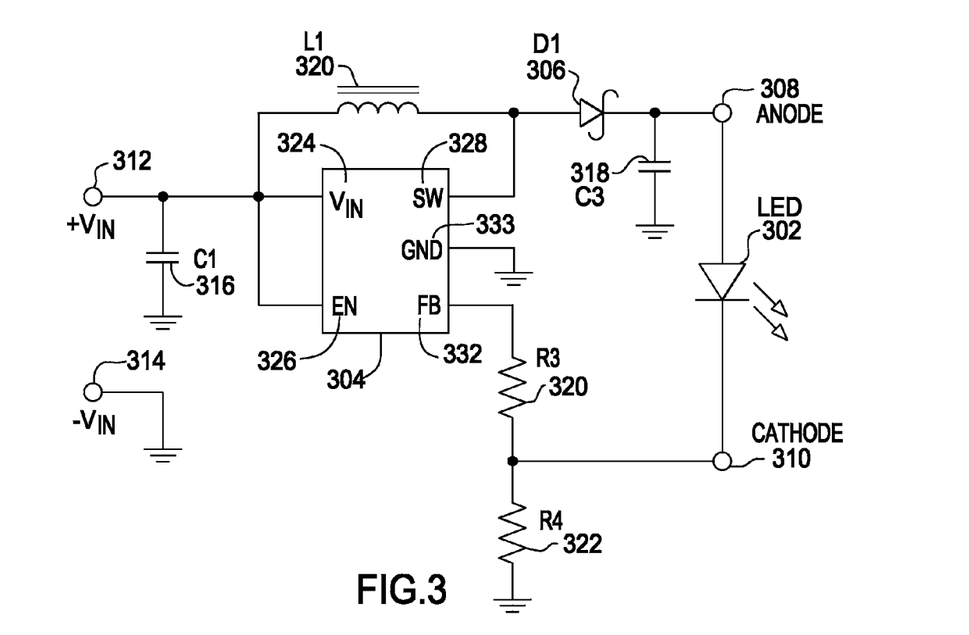
FIG. 3 is a schematic representation of a DC circuit used for a typical embodiment of a universal LED illumination device.

FIG. 3 is a schematic representation of a DC circuit used for a typical embodiment of a universal LED illumination device. A high frequency, low power DC-to-DC converter circuit is utilized to drive the LED 302 in the disclosed embodiment illustrated in FIG. 3. The high frequency of operation allows components of small size to be used. A positive voltage source is introduced at $+V_{in}$ 312 and branched to a capacitor C1 316 and inductor L1 320 and to two inputs ($V_{in}$ 324 and EN 326) of a switching circuit 304. The solid-state switching circuit 304 regulates the input voltage $V_{in}$ 324 to a specified value to achieve a switched output at SW 328 by receiving an enable signal EN 326 branched from $V_{in}$ 324. The inductor L1 320 is charged during the ON cycle phase of SW 328 and discharges in the OFF cycle phase to achieve the desired switched voltage output driving a Schottky diode D1 306 that in turn drives the anode side 308 of the output LED 302 and capacitor C3 318 which is terminated to ground. This Schottky diode D1 306 allows the current to flow in only one direction to the anode side 308 of the LED 302 via SW 328. The Schottky diode D1 306 also assures that there is a quantity of rectification of the AC signal flowing through the circuit so that the LED only sees half of the AC cycle, effectively acting as a DC signal. Capacitor C3 318 becomes a charge reservoir, averaging out what would otherwise be a sinusoidally varying voltage with one half of the sine wave missing.

The cathode side 310 of the LED 302 is pass through ground via R-4 322 and branched to the feedback FB pin 332 of the switching circuit 304 through resistor R3 320. The FB pin 332 acts as half of an operational amplifier that is comparing the voltage at R-4 322 above ground, to a reference voltage, (i.e., 1.23V). When the voltage at R-4 322 reaches its reference voltage, the switching circuit 304 stops supplying current. The FB pin 332 therefore serves as feedback reference within the switching circuit 304, determining the current values by comparing a feedback voltage to its internal reference and deciding whether more or less charge is needed, thereby regulating the circuit current. $-V_{in}$ 314, capacitors C1 316 and C3 318, resistor R4 322 and the ground terminal 330 of the switching circuit 304 are all terminated to ground.

In a constant current implementation, a current sense resistor is used to provide the voltage feedback. An integrated circuit of small size, Texas Instruments TPS61040 or TPS61041 is suitable for this purpose. Although designed for DC-to-DC operation in a suitable voltage range, the circuit can be easily modified to work at higher voltages by using a zener diode resistor combination, or to operate as an AC-to-DC converter by adding a rectifier circuit. Additional operational features such as light sensors, pulse circuits etc., can be added to provide for flashing operation or dimming. Multiple colored LEDs can be used to vary the desired colored output. Although only one LED is shown, several LEDs can be combined in a series circuit, parallel circuit or series-parallel circuit up to the limitations of the IC used. An appropriate LED may be chosen for use in this circuit to suit the particular application and sized to closely match the bulb dimensions and intensities of conventional lamps. Hence, by combining this circuit on a small form factor circuit board into an existing bulb base, together with the LED, a product can be obtained that has nearly identical or even superior form, fit, and function to traditional incandescent lamps. The circuit shown in FIG. 3 can be implemented in either a constant voltage output design or a constant current output design. The constant current design has advantages since light output is directly proportional to current, whereas slight variations in the LED manufacture require different operating voltages for a specific light output.

Because the circuit shown in FIG. 3 can be extremely compact, it can be incorporated in nearly any standard bulb base. With this implementation, the operating input voltage of the circuit is very wide (at least 1.5 V to 7 Volts), effectively drawing nearly all of the energy present in the battery pack, thereby making excellent utilization of available power. The disclosed circuit will allow the LED light bulb to maintain constant light output under a wide range of voltage input. For example, a 6 Volt battery pack will still operate the LED, at full brightness, when it only delivers slightly in excess of 1.5 V. In other words, when the batteries are effectively "dead" with respect to conventional light bulbs, this embodiment will continue to operate as though the batteries were at full capacity. There is little or no change in the light output from 6 Volts down to approximately 1.5 Volts, allowing for the use of nearly all the energy available from the battery. In addition, a 3 Volt battery pack and a 6 Volt battery pack for example, would use exactly the same light bulb, being completely interchangeable.

The circuit detailed in FIG. 3 can be readily expanded or combined with additional circuitry to introduce a variety of additional functions to the device. These functions may include but are not limited to: a dimming feature that allows the bulb to be used at one or more brightness levels; brightness levels being used as a power saving mode or as an indication of low battery or deficient external power; an automatic shut-off timer function; light output color changes; variable light beam direction; backup power supply; combination of incandescent and LED lighting; voice activation; or the like.

Figure 4:
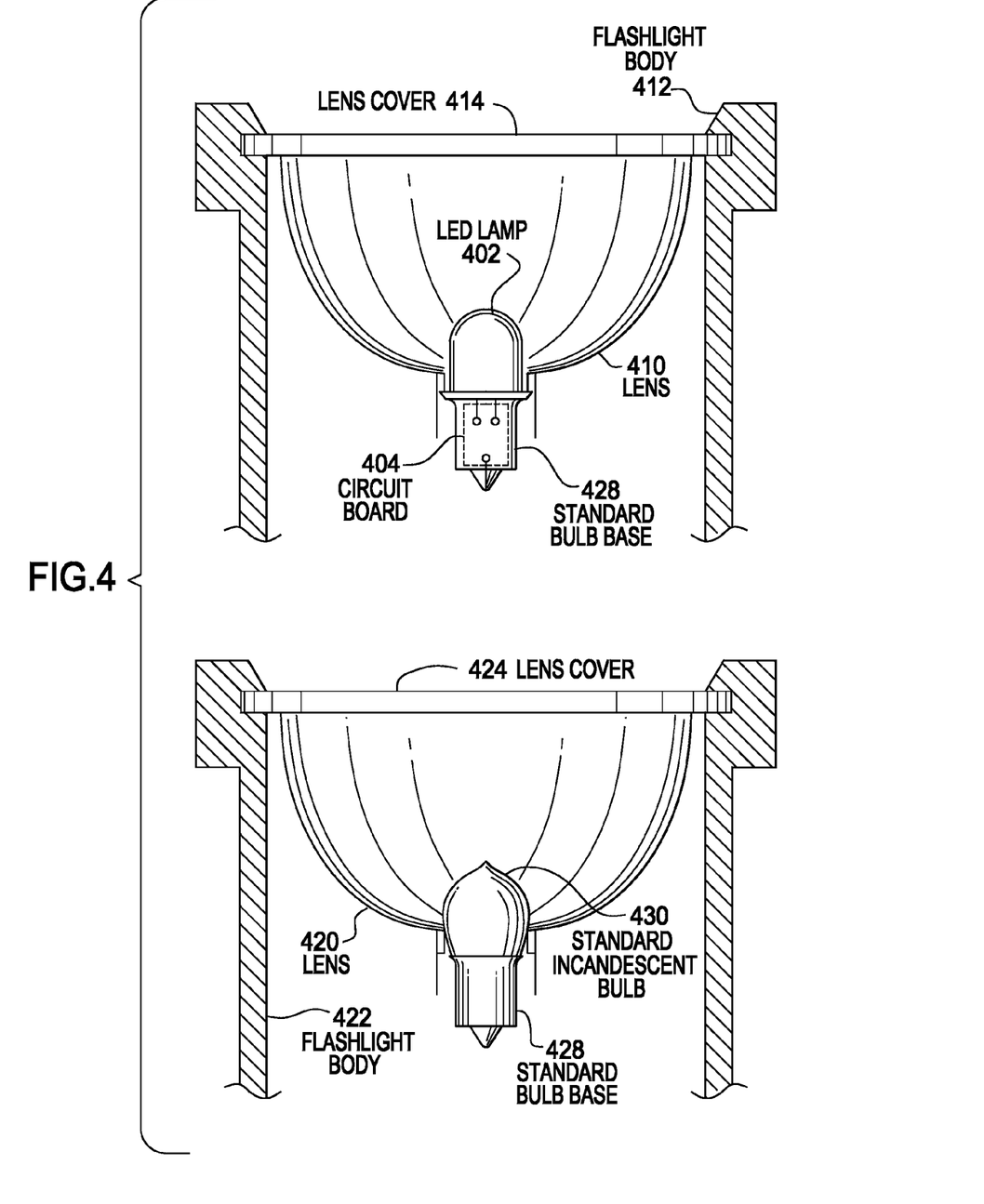
FIG. 4 is a drawing showing a typical embodiment of a universal LED illumination device in relation to an incandescent flashlight bulb application.

FIG. 4 is a drawing showing a typical embodiment of a universal LED illumination device in relation to an incandescent flashlight bulb application. As illustrated in FIG. 4, a flashlight body 422 containing a standard incandescent bulb 430 with a standard bulb base 428 is fixed within a reflector 420 to reflect and project a beam of light through reflector cover 424. This same configuration can be utilized with an LED lamp 402 as the light source. In, this application, a flashlight body 412 contains an LED lamp 402 with a standard bulb base 428. A circuit board 404 containing the necessary driver circuit and electronics for the LED lamp 402 is housed within this standard bulb base 428 thereby providing an overall envelope which is nearly identical to it in the incandescent bulb. The LED lamp 402 is similarly fixed within a reflector 410 to reflect and project a beam of light through reflector cover 414. This embodiment enables a single circuit and lighting device to be used with a variety of bulb bases thereby affording is an economic advantage both in manufacturing as well as to the user who may transfer the product to more than one application or stock one kind of bulb for multiple applications. This circuit is designed to adapt to various AC or DC power sources and accommodate the different voltages that may be present.

Figure 5:
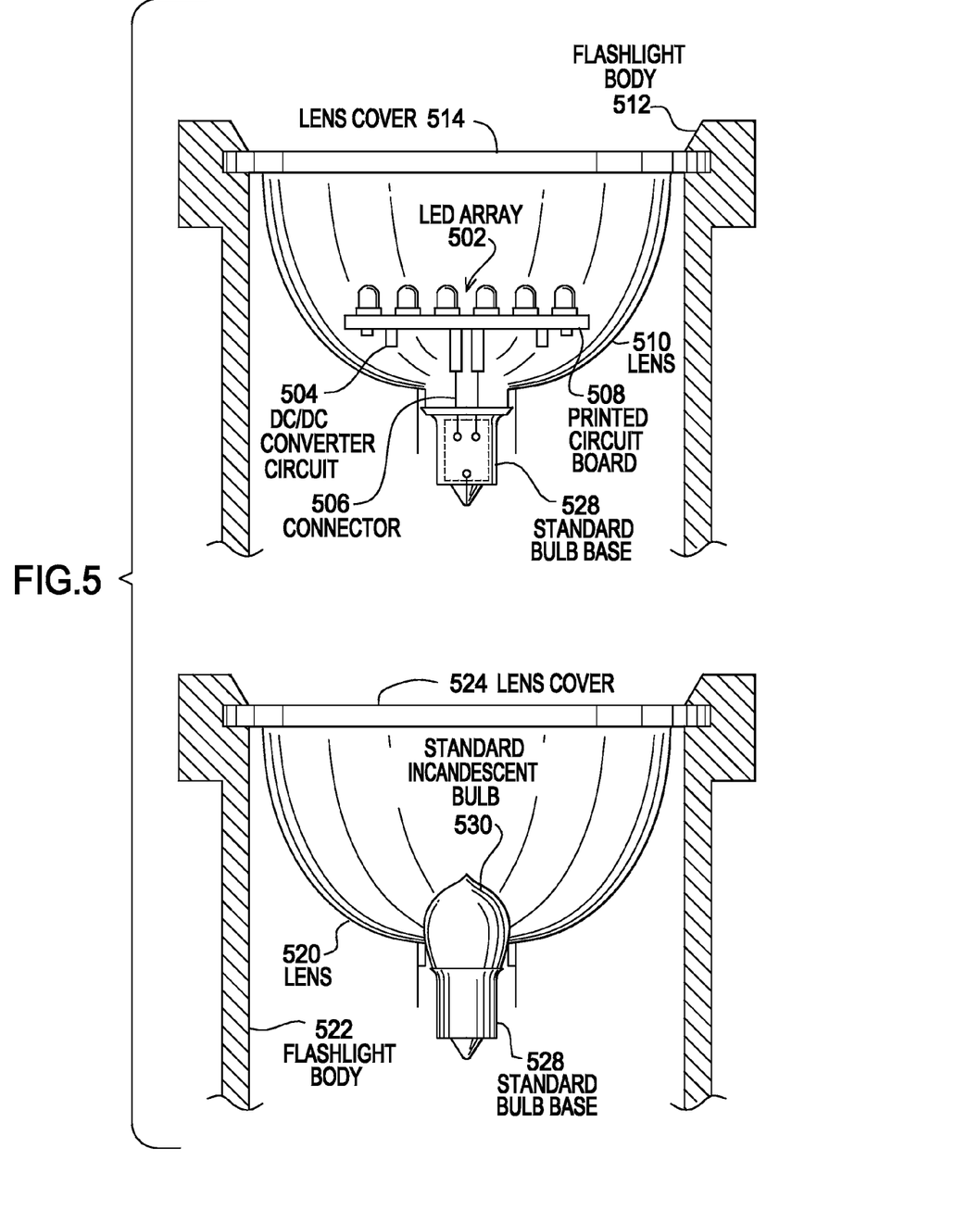
FIG. 5 is a drawing showing a typical embodiment of a universal LED array illumination device in relation to an incandescent flashlight bulb application.

FIG. 5 is a drawing showing a typical embodiment of a universal LED array illumination device in relation to an incandescent flashlight bulb application. As illustrated in FIG. 5, a flashlight body 522 containing a standard incandescent bulb 530 with a standard bulb base 528 is fixed within a reflector 520 to reflect and project a beam of light through reflector cover 524. This same configuration can be utilized with an LED array 502 of lamps as the light source. In, this application, a flashlight body 512 contains an LED array 502 of lamps while still utilizing a standard bulb base 528. The LED array 502 can be mounted on a flat surface, such as a printed circuit (PC) board 508. In this embodiment, a PC board is equipped on its top surface with one or more LEDs connected in either a series or parallel circuit. This top surface may (or may not) contain electronic components such as ICs, resistors, capacitors and the like. The bottom surface may also contain circuitry and its associated electronic components such as a DC-to-DC converter circuit 504 and may contain an electrical connector which mates to a complimentary connector mounted within a standard bulb base 528. The bulb base 528 in this example is used to make electrical connections to an electrical source (not shown) and deliver the power to the wafer-shaped PC board 508. This DC-to-DC converter circuit 504 is designed to adapt to various power sources and accommodate the different voltages that may be present. Similar circuits may be utilized to allow the aforementioned embodiments to be powered by either AC or DC source current. The LED array 502 is similarly fixed within a reflector 510 to reflect and project a beam of light through reflector cover 514. This embodiment enables a single circuit and lighting device to be used with a variety of bulb bases thereby affording is an economic advantage both in manufacturing as well as to the user who may transfer the product to more than one application. This single circuit is designed to adapt to various AC or DC power sources and accommodate the different voltages that may be present.

Figure 6:
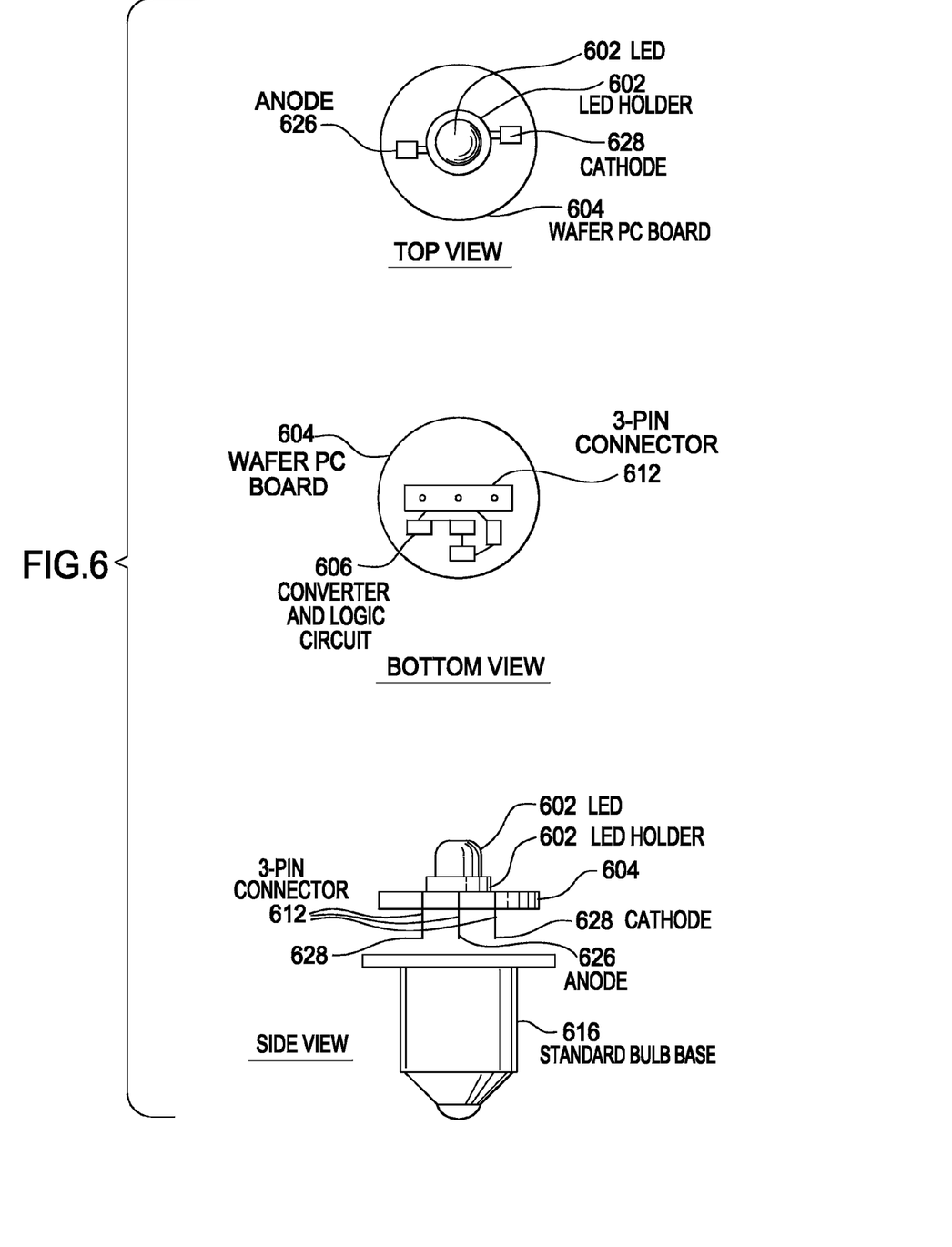
FIG. 6 is a drawing showing a typical embodiment of a universal LED illumination device to retrofit an incandescent lightbulb application.

FIG. 6 is a drawing showing a typical embodiment of a universal LED illumination device to retrofit an incandescent lightbulb application. As illustrated in FIG. 6, an LED 602 is mounted to a wafer PC board 604 such that the LED 602 will project light outward and approximately perpendicular to the top surface of the PC board 604. The LED 602 is mounted to the PC board 604 by an anode 626 and cathode 628 attachments on the top surface. The converter and logic circuit 606 can be mounted on either or both sides of the wafer PC board 604 and are shown in FIG. 6 on the bottom surface. This LED 602 and associated converter and logic circuit 606 are connected to a 3-pin connector 612 that facilitates an easy connection to a standard bulb base 616. This connection is made through a single anode 626 connector located in the center of the 3-pin connector 612, and two cathode 628 connectors that have been bifurcated from the LED 602 and placed lateral to the anode 626. This cathode geometry allows the LED and circuitry module to be placed into connection in either left or right orientation within the 3-pin connector 612.

Figure 7:
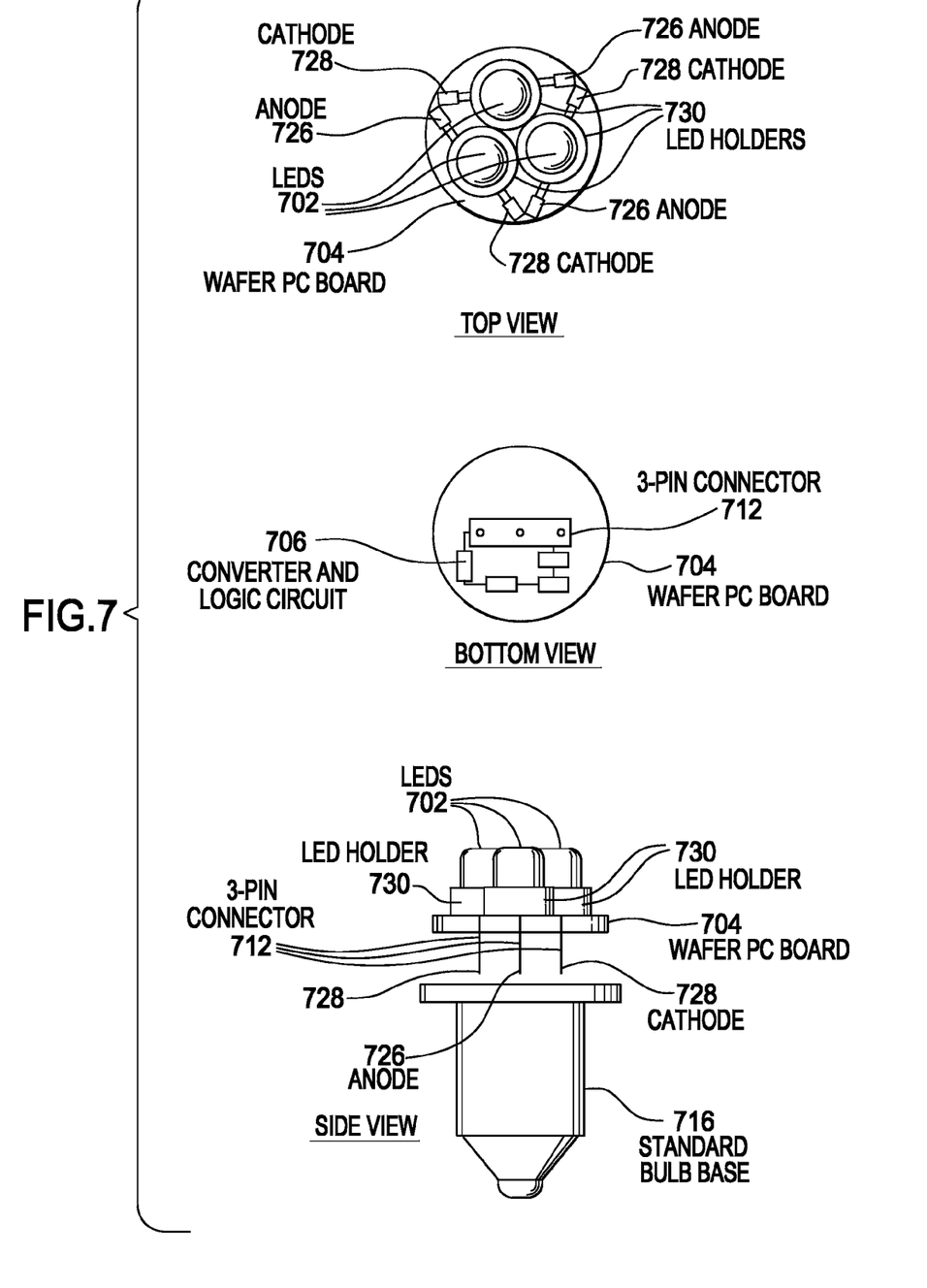
FIG. 7 is a drawing showing a typical embodiment of a universal LED illumination device to retrofit an incandescent lightbulb application.

FIG. 7 is a drawing showing a typical embodiment of a universal LED illumination device to retrofit an incandescent lightbulb application. As illustrated in FIG. 7, a set of LEDs 702 is mounted in a triangular pattern to a wafer PC board 704 in either a series or parallel configuration such that the LEDs 702 will project light outward and approximately perpendicular to the top surface of the PC board 704. The LEDs 702 are mounted to the PC board 704 by an anode 726 and cathode 728 attachments for each LED 702 on the top surface. The converter and logic circuit 706 can be mounted on either or both sides of the wafer PC board 704 and are shown in FIG. 7 on the bottom surface. These LEDs 702 and associated converter and logic circuit 706 are connected to a 3-pin connector 712 that facilitates an easy connection to a standard bulb base 716. This connection is made from each LED through to a single anode 726 connector located in the center of the 3-pin connector 712, and two cathode 728 connectors that have been bifurcated from each LED 702 and placed lateral to the anode 726. This cathode geometry allows the LED and circuitry module to be placed into connection in either left or right orientation within the 3-pin connector 712.

Figure 8:
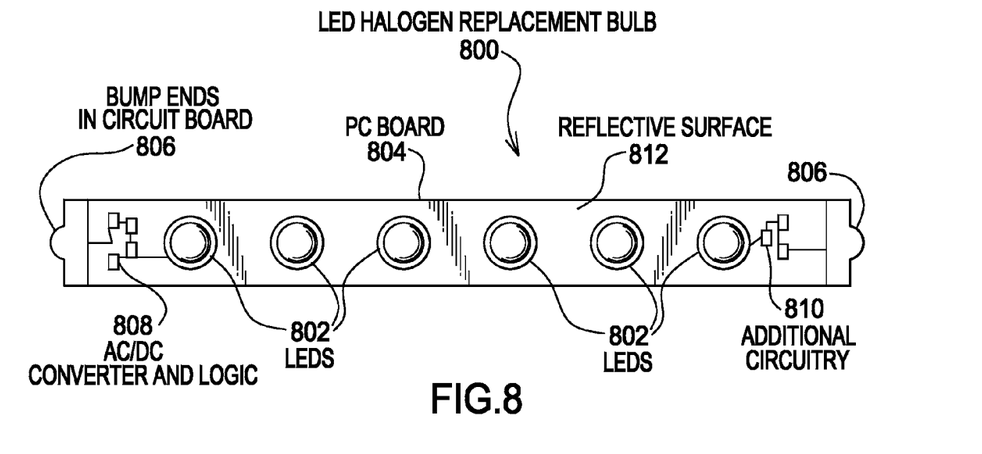
FIG. 8 is a drawing showing a typical embodiment of a universal LED illumination device to retrofit a halogen lightbulb application.

FIG. 8 is a drawing showing a typical embodiment of a universal LED illumination device to retrofit a halogen lightbulb application. As illustrated in FIG. 8, a group of LEDs 802 is mounted to a PC board 804 such that the LEDs 802 will project light outward and perpendicular to the top surface of the PC board 804 to produce an LED halogen replacement bulb 800. The converter and logic circuit 808 can be mounted on either or both sides of the wafer PC board 804 and are shown in FIG. 8 on the top surface. This top surface can be coated with a reflective surface 812 to increase light output intensity by reflecting light otherwise lost and enhance heat dissipation of the LEDs and circuitry. These LEDs 802 and associated converter and logic circuit 808 are made to connect employing "bump ends" 806 that adapt the PC board to fit and electrically connect within halogen bulb fixtures. The large area of PC board 804 space additionally allows for additional circuitry 810 to be readily added to either side of the described embodiment.

Figure 9:
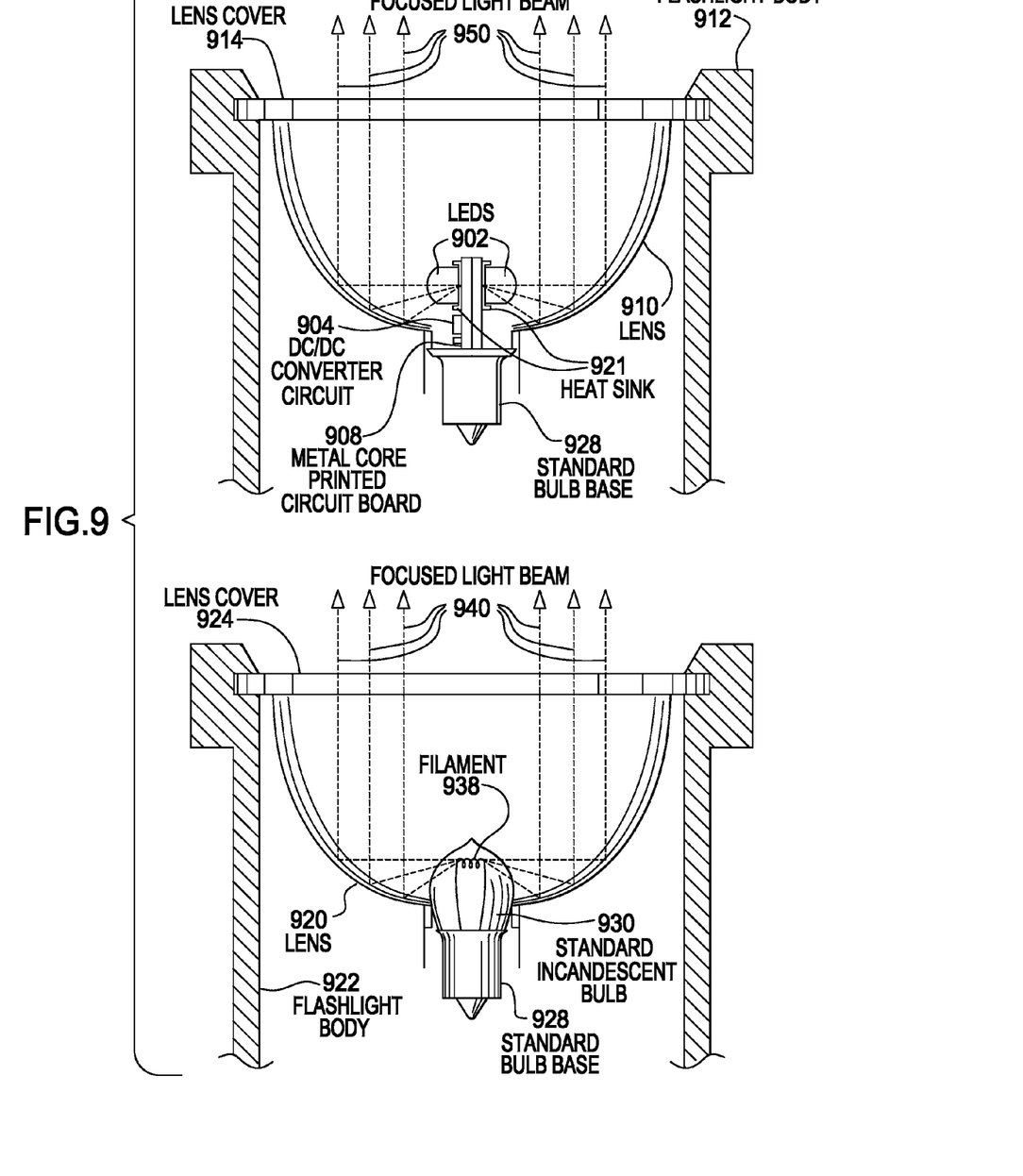
FIG. 9 is a drawing showing a typical embodiment of a universal LED illumination device to retrofit a focused beam incandescent flashlight application.

FIG. 9 is a drawing showing a typical embodiment of a universal LED illumination device to retrofit a focused beam incandescent flashlight application. In particular products such as flashlights, a reflective parabolic reflector is an integral part of the product's feature set. In certain applications, the reflective reflector can be moved up and down by rotating a portion of the flashlight's barrel. When this is done, the reflector moves up and down thereby moving the bulb above, through and below the prime focus of the parabolic reflector. This has the effect of focusing or dispersing the light beam to give either a narrow spot or broad beam. Because LEDs usually contain focusing optics, a forward mounting as described above is usually an adequate implementation. However, to take advantage of unique features that may already be present in existing applications, an aftermarket implementation that addresses these specific features and associated needs is necessary.

As illustrated in FIG. 9, a flashlight body 922 containing a standard incandescent bulb 930 with a standard bulb base 928 is fixed within a reflective parabolic reflector 920 to reflect and project a beam of light through reflector cover 924. The reflector 920 acts to reflect the light emanating from the filament in a standard incandescent bulb 930 to a focused light beam 940. A similar configuration can be utilized where an LED replacement bulb is designed to allow light to emanate from one or more LEDs 902 mounted to a PC board 908. In this embodiment, the planar axis of the PC board 908 is mounted within a standard bulb base 928 and positioned parallel to a focused beam of light 950. As illustrated in FIG. 9, two LEDs 902 are used, one each on either side of a metal core PC board 908. The LEDs 902 in this embodiment send there light directly towards the surface of the parabolic reflector 910 and project as a focused light beam 950 through reflector cover 914.

The LEDs 902 are positioned such that they are in the same position relative to the focal point on the parabolic reflector 910 as the filament is in the incandescent bulb 930 it replaces. In this way, the focusing/defocusing feature works as it was intended to since the light is emitted either above or below the prime focus. Hence, both the user and the manufacturer can employ this product and gain the advantages of high efficiency and long life of the LEDs without losing the optical features of the product. Either surface of the PC board 908 may also contain circuitry and associated electronic components such as a DC-to-DC converter circuit 904 and may contain an electrical connector that mates to a complimentary connector (not shown) mounted within a standard bulb base 928. The bulb base 928 in this example is used to make electrical connections to an electrical power source (not shown) and deliver the power to the PC board 908.

Because the generation of excessive heat is a great detriment to the LED and associated circuitry, additional elements can easily be added to the disclosed embodiments such as the incorporation heat sink devices 921 or materials in or on the PC board. A metal core PC board 908 is shown in this embodiment to demonstrate the ease in which heat dissipation techniques can be adapted to the aforementioned embodiments.

Figure 10:
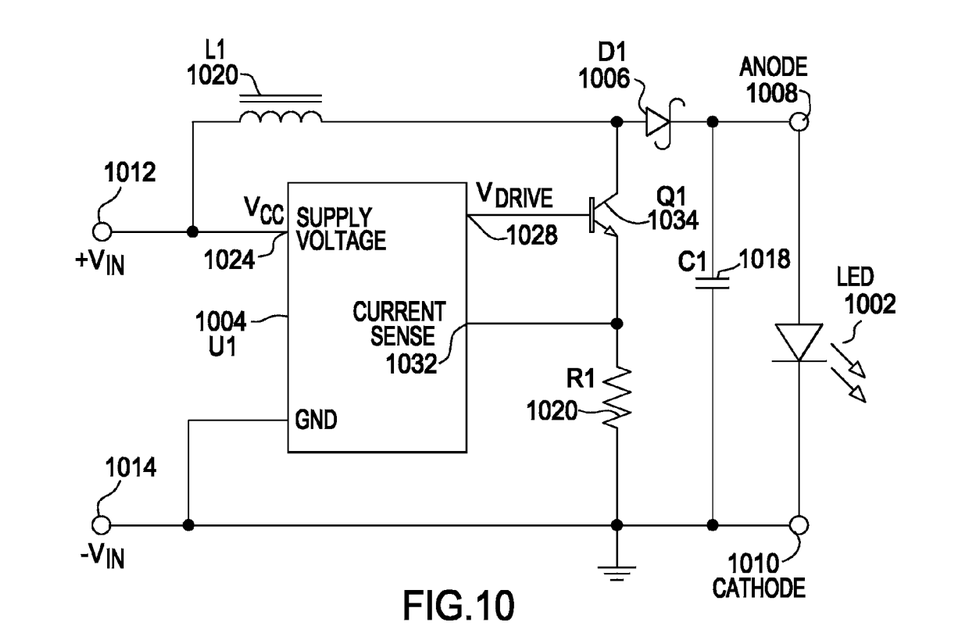
FIG. 10 is a schematic representation of a DC circuit used for a typical embodiment of a universal LED illumination device.

FIG. 10 is a schematic representation of a DC circuit used for a typical embodiment of a universal LED illumination device. Although the circuit of FIG. 3 is well suited for constant current operation of low power LEDs where the current required is on the order of 20 mA, the sense resistor R4 322 in that circuit dissipates power that may be less than optimal at higher current levels. An alternative higher current, high frequency, DC-to-DC converter circuit that generates a constant power output, ideal for higher current applications, is utilized to drive the LED 1002 in the disclosed embodiment illustrated in FIG. 10.

A positive voltage source is introduced at $+V_{in}$ 1012 and branched to an inductor L1 1020 and to inputs $V_{CC}$ 1024 of an IC driver circuit U1 1004 (i.e., Zetex ZXSC310). The solid-state driver circuit 1004 regulates the input voltage $V_{CC}$ 1024 to a specified value to achieve a switched output at $V_{Drive}$ 1028, which in turn drives an external transistor Q1 1034. The inductor L1 1020 is charged during the ON cycle phase of Q1 1034 and discharges in the OFF cycle phase to achieve the desired switched voltage output driving a Schottky diode D1 1006 that in turn drives the anode side 1008 of the output LED 1002 and capacitor C10 1018 which is terminated to ground. This Schottky diode D1 1006 allows the current to flow in only one direction to the anode side 1008 of the LED 1002 via Q1 1034. The Schottky diode D1 1006 also assures that there is a quantity of rectification of the AC signal flowing through the circuit so that the LED only sees half of the AC cycle, effectively acting as a DC signal. Capacitor C1 1018 becomes a charge reservoir, averaging out what would otherwise be a sinusoidally varying voltage with one half of the sine wave missing. A low value sensing resistor, R1 1020 is connected to the ON phase of external transistor Q1 1034 and minimizes power dissipation. The transistor switches ON and allows current to flow through R1 1020, where the voltage drop provides the necessary current sense input to the current sense pin 1032 of the IC U1 1004.

The cathode side 1010 of the LED 1002 is pass through ground via R-4 1022 and branched to ground. When the current at R1 1020 reaches its reference current, the comparator 1004 stops supplying current. The current sense pin 1032 therefore serves as feedback reference within the driver circuit 1004, determining the current values by comparing a feedback current to its internal reference and deciding whether more or less charge is needed, thereby regulating the circuit current. $-V_{in}$ 1014, capacitors C1 1018 and, resistor R1 1020 and the ground terminal 1030 of the driver circuit 1004 are all terminated to ground.

Figure 11:
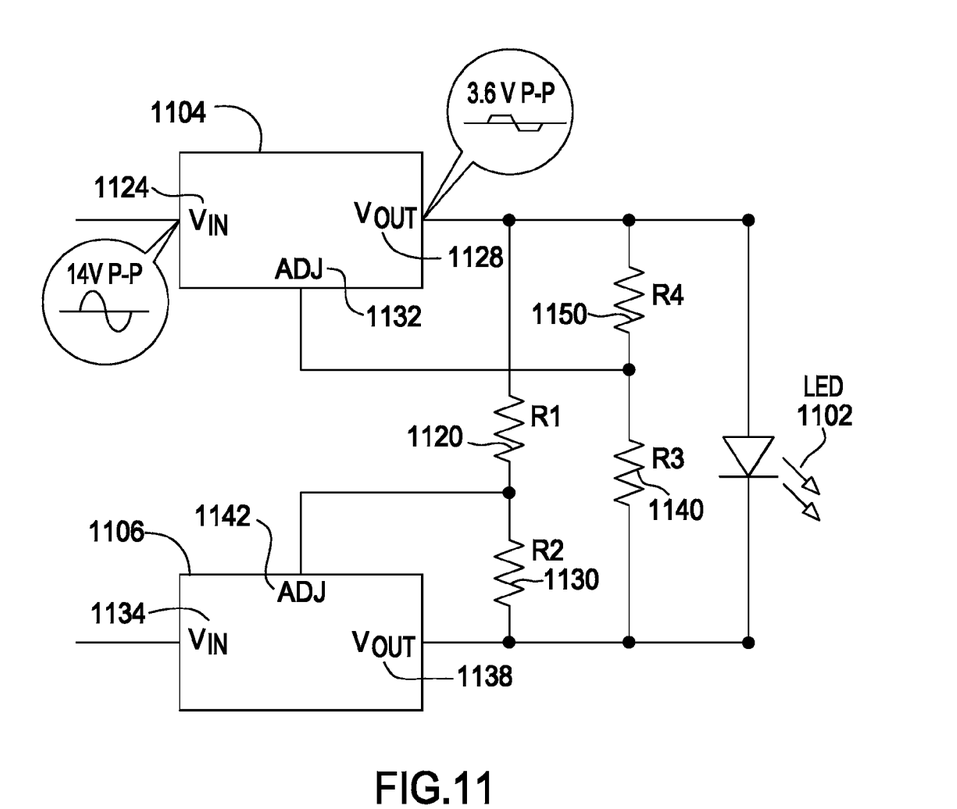
FIG. 11 is a schematic representation of an AC circuit used for a typical embodiment of a universal LED illumination device.

FIG. 11 is a schematic representation of an AC circuit used for a typical embodiment of a universal LED illumination device. Although the circuits of FIG. 3 and FIG. 10 are well suited for DC operation of low power LEDs, FIG. 11 illustrates a typical AC circuit suitable for driving a universal LED illumination device. In the case of bulbs intended for AC applications, a method can be used to rectify the AC voltage to produce a DC signal as referred to above. However, circuits that merely rectify the AC voltage are best suited for use with batteries and when the DC voltage available is less than or equal to the operating voltage of the array of one or more LEDs. For example, with halogen bulbs, a 14V AC source is often used as the power source and is excessive for one or two LEDs. In this instance, an AC voltage regulator may be used in conjunction with the LED that utilizes the inherent property of rectification of an LED that will generally withstand 5 V in reverse bias.

An alternating current voltage source is introduced to two IC regulator circuits 1104 and 1106 (i.e., National LM317) at $V_{in}$ 1024 and $V_{in}$ 1034. The solid-state regulator circuits 1104 and 1106 regulate the positive and negative going potential using the internal voltage reference of the IC and chop the sinusoidal input from, for example 14V peak-to-peak (P-P) to 3.6 V P-P to set the voltage output at $V_{out}$ 1028 and $V_{out}$ 1038. Chopped outputs $V_{out}$ 1028 and $V_{out}$ 1038 feed through parallel ladder path, the first rung containing R1 1120 and R2 1130 in series, the second rung containing R3 1140 and R4 1150 in series, and the third rung containing an LED 1102. The first rung is connected between R1 1120 and R2 1130 to a comparator input ADJ 1132 on regulator circuit 1104 and the second rung is connected between R3 1140 and R4 1150 to a comparator input ADJ 1142 on regulator circuit 1106. These comparator inputs ADJ 1132 and ADJ 1142 are used as a feedback loop to compare the external voltage reference to an internal voltage reference $V_{ref}$ to set the voltage output $V_{out}$ 1028 and $V_{out}$ 1038.

In this configuration, the ratio of R3/R4 and R1/R2 determine the positive and negative voltage maximum. Here, the 14 V AC peak-to-peak signal is reduced to nearly a square wave with a 3.6V P-P max being used drive the LED 1102, using the LED 1102 to rectify the signal.

$V_{out}+=V_{ref}(1.25\ V)\ [1+(R1/R2)]$ is the positive going voltage maximum and $V_{out}-=V_{ref}(1.25V)\ [1+(R3/R4)]$ is the negative going voltage maximum.

Generally, the $V_{out}$—would be kept within a range well tolerated by the reverse characteristics of the LED 1102.

The invention claimed is:

1. An illumination assembly for use as part of a device for illuminating an object by directing a beam of light from the device onto the object, said device including a housing defining a given area for directing said beam of light outward from the housing, said illumination assembly comprising:

(a) a printed circuit board having a planar front surface and a planar back surface and a side edge extending between said front and back surfaces;

(b) at least one solid state light source having an underside base mounted onto the front surface of said printed circuit board such that its underside base is adjacent to and confronting said front surface, and (c) control circuitry connected with said solid state light source and printed on at least one of the surfaces of said printed circuit board for connecting the solid state light source to a source of power in order to control the illumination of said solid state light source;

(d) said illumination assembly being adapted for connection with said housing such that the solid state light source is disposed within said given area in a way which causes said beam of light from said solid state light source to emanate out of said given area; and (i) wherein said printed circuit board is longer than it is wide and the planar front and back surfaces of the printed circuit board extends from one lengthwise end of the latter to an opposite lengthwise end thereof, said printed circuit board further including first and second electrically conductive bumps on said lengthwise ends and serving as an electrical input and output, respectively; (ii) wherein the device includes a plurality of solid state light sources mounted on the front surface of said printed circuit board in spaced apart relationship to one another along the elongated length of the circuit board; and (iii) said control circuitry is connected with said solid state light sources and said bumps and printed on at least one of the surfaces of said printed circuit board for connecting the solid state light sources to said bumps in order to control the illumination of said solid state light source when said bumps are connected to a source of power.

2. An illumination assembly according to claim 1 wherein said solid state light source is an LED.

* * * * *